(12) United States Patent
Bonucci et al.

(10) Patent No.: US 8,673,060 B2
(45) Date of Patent: Mar. 18, 2014

(54) COMPOSITE H₂O ABSORBER FOR SEALED MEDICAL DEVICES

(75) Inventors: Antonio Bonucci, Milan (IT); Sergio Rondena, Magenta (IT); Lorena Cattaneo, Busto Arsizio (IT)

(73) Assignee: SAES Getters S.p.A., Lainate MI (IT)

( * ) Notice: Subject to any disclaimer, the term of this patent is extended or adjusted under 35 U.S.C. 154(b) by 180 days.

(21) Appl. No.: 13/000,971

(22) PCT Filed: Jul. 9, 2009

(86) PCT No.: PCT/EP2009/058782
§ 371 (c)(1),
(2), (4) Date: Dec. 22, 2010

(87) PCT Pub. No.: WO2010/009986
PCT Pub. Date: Jan. 28, 2010

(65) Prior Publication Data
US 2011/0113959 A1 May 19, 2011

(30) Foreign Application Priority Data
Jul. 25, 2008 (IT) .............................. MI2008A1374

(51) Int. Cl.
*B01D 53/02* (2006.01)
(52) U.S. Cl.
USPC ............... 95/117; 96/108; 206/7; 206/204
(58) Field of Classification Search
None
See application file for complete search history.

(56) References Cited

U.S. PATENT DOCUMENTS

| 4,014,346 | A | * | 3/1977 | Brownlee et al. ............... 607/33 |
| 4,036,360 | A | * | 7/1977 | Deffeyes ...................... 206/204 |
| 4,081,397 | A | | 3/1978 | Booe |
| 4,127,134 | A | * | 11/1978 | Ushakoff .......................... 607/9 |
| 5,078,909 | A | | 1/1992 | Shigeta et al. |
| 5,591,379 | A | | 1/1997 | Shores |
| 6,080,350 | A | * | 6/2000 | Hekal ............................. 264/255 |
| 6,226,890 | B1 | * | 5/2001 | Boroson et al. ................. 34/472 |
| 6,493,960 | B2 | | 12/2002 | Taylor et al. |
| 6,596,192 | B2 | * | 7/2003 | Himeshima et al. ..... 252/188.28 |
| 6,681,135 | B1 | * | 1/2004 | Davis et al. ...................... 607/21 |
| 6,740,145 | B2 | * | 5/2004 | Boroson et al. ................ 96/108 |
| 6,743,524 | B2 | * | 6/2004 | Schaepkens .................. 428/689 |
| 8,034,739 | B2 | * | 10/2011 | Solovyov et al. ............ 502/402 |
| 2003/0037677 | A1 | | 2/2003 | Boroson et al. |
| 2003/0079772 | A1 | * | 5/2003 | Gittings et al. ............... 136/251 |
| 2003/0109628 | A1 | * | 6/2003 | Bonfanti et al. .............. 524/507 |
| 2005/0000901 | A1 | * | 1/2005 | Campbell et al. ............ 210/660 |
| 2007/0135552 | A1 | * | 6/2007 | Wrosch et al. ................ 524/443 |
| 2009/0018633 | A1 | * | 1/2009 | Lindquist et al. ............ 623/1.11 |
| 2010/0314579 | A1 | * | 12/2010 | Rondena et al. .............. 252/194 |

FOREIGN PATENT DOCUMENTS

| CN | 101222977 A | 7/2008 |
| JP | S4-10-1978 | 4/1978 |
| JP | 2000-504773 | 2/1997 |
| JP | 2003-154227 | 5/2003 |
| WO | 97/31069 | 2/1996 |
| WO | WO 9731069 A1 * | 8/1997 |
| WO | 99/61856 | 12/1999 |
| WO | 99/62697 | 12/1999 |
| WO | 00/09848 | 2/2000 |
| WO | 01/66625 | 9/2001 |
| WO | 2007/013118 | 2/2007 |
| WO | 2007/013119 | 2/2007 |
| WO | 2007013119 A1 | 2/2007 |
| WO | 2009/043776 | 4/2009 |
| WO | 2009/043817 | 4/2009 |

OTHER PUBLICATIONS http://www.perfomaxtech.com/know-how%20of%20L80-5000%20wvtr.PDF p. 3.*
PCT International Search Report for PCT/EP2009/058782 filed Jul. 9, 2009 in the name of Antonio Bonucci et al.
PCT International Report on Preliminary Patentability for PCT/EP2009/058782 filed Jul. 9, 2009 in the name of Antonio Bonucci et al.
PCT Written Opinion for PCT/EP2009/058782 filed Jul. 9, 2009 in the name of Antonio Bonucci et al.
Gerald E. Loeb et al., "BION™ Implants for Therapeutic and Functional Electrical Stimulation", CRC Press, 3; pp. 75-99 (2001).
William Andrew Publishing, "Permeability and Other Film Properties of Plastics and Elastomers" Plastics Design Library, (1995).
First Office Action issued for China's Patent Application No. 200980125858.8 filed on in the name of Saes Getters S.P.A.; mailing date: Sep. 18, 2012 (original and English translation).
Office Action issued for China's Patent Application No. 200980125858.8 filed in the name of Saes Getters S.P.A. mail date: Sep. 4, 2013 (English translation and original).
Japanese Office Action mailed on Oct. 29, 2013 for Japanese Application 2011-519109 filed on Jul. 9, 2009 in the name SAES GETTERS S.P.A.
Yasuda T., Test methods and evaluation results of dynamic characteristics of plastic materials, Plastics 2000, 51: 119-127 (Tables 3 & 4 translated into English).

* cited by examiner

*Primary Examiner* — Duane Smith
*Assistant Examiner* — Phillip Shao
(74) *Attorney, Agent, or Firm* — Steinfl & Bruno, LLP

(57) ABSTRACT

There are described composite absorbers for sealed medical devices, which comprise an active species dispersed in a polymeric matrix having an H₂O transmission comprised between $0.05\, g\, mm^{-2}\, d^{-1}$ and $5.4\, g\, mm\, m^{-2}\, d^{-1}$ at 25° C. and 100% RH, and a method for H₂O removal from the sealed medical devices by means of said composite absorbers.

5 Claims, No Drawings

COMPOSITE H$_2$O ABSORBER FOR SEALED MEDICAL DEVICES

CROSS REFERENCE TO RELATED APPLICATIONS

The present application is the U.S. national stage of International Application PCT/EP2009/058782 filed on Jul. 9, 2009 which, in turn, claims priority to Italian Patent Application MI2008A001374 filed on Jul. 25, 2008.

The present invention relates to a composite H$_2$O absorber for sealed medical devices, with particular but not exclusive reference to medical devices that can be implanted in the human body.

Recent developments in the field of sealed medical devices, like e.g. pacemakers, neurostimulators, acoustic aids, defibrillators, electromechanical systems for the controlled release of medicines, implantable cardioverter defibrillator, cardiac resynchronization therapy led and lead to a continuous improvement of their characteristics, both in terms of performance and reliability.

In the following reference will be made to implantable devices, since they are those most benefiting from the invention.

These devices are usually sealed under an inert gas atmosphere, typically nitrogen or argon and helium although some particular manufacturing processes provide for their sealing in dry air.

Regardless of the fact of using or not an anhydrous gas for the sealing of the medical device, it can not be excluded that noxious species, initially in a gaseous phase, can accumulate inside the device over time and interfere with the correct operation of the device, or even damage it in an irreversible manner. Moisture is one of the mostly noxious species due both to its corrosiveness with respect to the components used inside the device and to its possible damage to the operation of electronic components.

The moisture present inside a sealed medical device may originate by three different manners. A first cause can derive from the manufacturing process itself, the outgassing of components of the medical device is a second possible cause, while a third one is related to the permeation through the walls of the sealed device. This latter permeation phenomenon from the outside to the inside of the device may sometimes be present also once the device is installed, whereas for other devices the greatest amount of water comes in during the time between the manufacturing of the device and its actual installation. In this regard, the junctions of the sealed medical device typically exhibit the greatest permeation from the external environment.

Major details concerning the effects of the ingress of H$_2$O inside the medical device, as well as the maximum allowable permeation from the outside for several medical devices can be found on chapter 3 of the book "Neutral Prostheses for Restoration of Sensory and Motor Function", by Chapin and Moxon, published in 2001 by CRC Press. This reference also refers to the possible and typical use of getter materials to remove H$_2$O from the sealed devices.

Besides this functional need for removing H$_2$O from the inside of the sealed medical device, typically obtained by using a getter material, there is another need of industrial nature, related to the manufacturing processes of the devices, according to which it should ideally be possible to handle the getter material in air without excessively compromising its capacity. This allows to avoid to use means and methods that make the manufacturing process more complex and expensive, such as for example the use of glove boxes through which an anhydrous gas flows, or allowing the use of manufacturing means being less performing from this point of view, or the reduction of the number of operations to be carried out in a glove box.

Therefore, there are two opposite requirements for the H$_2$O absorber: on the one hand the absorber must be able to absorb water coming into or already present in the device and thus have such an absorbing speed to avoid the increase of water concentration inside the device, while on the other hand the absorber must not have excessive degradation due to the exposure to air or due to other manipulations made under conditions in which the absorber is exposed to a non-anhydrous atmosphere.

The generic use of composite absorbers made up of an active species useful for the removal of H$_2$O and dispersed inside a polymeric matrix is described in patent U.S. Pat. No. 5,078,909, but in this patent no specific reference is made to the properties of the polymer in terms of water permeation or transmission.

Composite absorbers are also described in patent publications WO 2007/013118 and WO 2007/013119, both in the applicant's name, where WO 2007/013118 teaches the use of an absorber material arranged in the pores of a porous material that is in turn dispersed in a polymeric matrix, but does not teach any specific permeation value of the polymer, whereas WO 2007/013119 discloses active barriers, i.e. composite systems made of active materials dispersed in a polymer having a low permeability, i.e. a permeability lower than 0.00215 10$^{-3}$ g mm m$^{-2}$ d$^{-1}$.

The problem of using polymers having a given permeability in order to protect medicines avoiding exposure to H$_2$O is instead described in the international publication WO 99/61856, wherein this technical effect is obtained through the formation of micro-channels deriving from the removal of a suitable additive. This document describes the possibility that these channels keep in communication the noxious species with an absorber. Therefore, the function of the polymer as taught in this document is merely that of an agent suitable to contain and enclose the active species and to guarantee the communication between the inner atmosphere of the medicine container and the active species, without any shielding and protecting action of the active species by means of the polymer itself.

Object of the present invention is to provide a specific composite absorber for sealed medical devices, which is able to overcome the problems still present in the prior art, i.e. to provide a composite absorber that ensures a sufficient H$_2$O absorbing speed from the housing of the medical device and that can be handled in air without any special caution for the time requested by the production process, in order to simplify the manufacturing of the device.

In a first aspect thereof, the invention relates to a composite H$_2$O absorber for sealed medical devices comprising an active species dispersed in a polymeric matrix, characterized in that said polymeric matrix has a MVTR comprised between 0.05 g mm m$^{-2}$ d$^{-1}$ and 5.4 g mm m$^{-2}$ d$^{-1}$ at 25° C. and 100% RH.

MVTR indicates the coefficient of transmission of the polymer (Moisture Vapour Transmission Rate), which is measured according to ASTM E96 procedure at 25° C. and 100% relative humidity. In the following, the indication RH (Relative Humidity) will be used for this unit of measurement.

The wording "active species" indicates any material suitable to remove (i.e. to getter) H$_2$O through physisorbing, chemisorbing mechanisms or both of them.

In particular, the inventors have found that by means of a composite absorber made according to the present invention it is possible to ensure an $H_2O$ absorption in the medical device comprised between 2.5% and 15.2%, expressed as a weight percentage with respect to the total weight of the composite absorber and not of the sole active species dispersed therein. Moreover, the composite absorber of the present invention may be handled in air under typical use conditions (22° C., 22% RH) without excessively jeopardizing its ability of removing $H_2O$. In particular, for example, samples having a thickness of 0.2 mm are characterized by a 3% loss with respect to their initial capacity when exposed in air for one hour, whereas the exposure time increases up to ten hours when the thickness is 1 mm in order to have the same loss of capacity.

The use of polymeric barriers comprising an active species for use in solar panels is described in patent applications WO 2009/043776 and WO 2009/043817, both the applicant's name. These applications are characterised by using a polymeric material having a $H_2O$ transmission lower than 10 g mm m$^{-2}$ d$^{-1}$ measured at 25° C. and 100% RH. Considering the specific use as barriers, and thereby the technical effect desired, the transmission must be as low as possible. Therefore, no teaching can be found in these applications concerning composite absorbers for sealed medical devices, with particular reference to the minimum $H_2O$ transmission value allowing their use for removing $H_2O$ from sealed medical devices, thus avoiding its noxious collection inside the device.

Among the active species for the sorption of $H_2O$ zeolites, silica gel, alumina, alkaline metal oxides and alkaline-earth metal oxides can be used either alone or in combination.

In the field of sealed medical devices there are applications that operate at temperatures higher than the ambient temperature or that anyway cause a local overheating in proximity to the composite absorber. In particular, the use of calcium oxide is preferred at temperatures of 65° C. of higher.

Although water is the mostly undesirable species for the sealed medical device, the presence of other gaseous species, the most common of which are from this point of view hydrogen, carbon dioxide, carbon monoxide and hydrocarbons, is also noxious for some of these devices. In this case it is particularly useful that the composite absorber contains one or more getter materials suitable to absorb also these noxious species and not only $H_2O$.

Concerning the polymeric matrix in which the active species is dispersed, useful materials for carrying out the invention are for example: Ethylene-Vinyl Acetate (EVA), Low Density PolyEthylenes (LDPE), Medium Density PolyEthylenes (MDPE) and High Density PolyEthylenes (HDPE), PolyEther-Block-Amide (PEBA), ionomeric resin such as Surlyn™ sold by DuPont, Ethylene-acrylic acid copolymers such as for example Lucalen® sold by Basell, PolyVinylidene Fluoride (PVDF), PolyVinylButyral (PVB) and PolyVinylidene Chloride (PVDC) such as Saran™ sold by DOW Chemicals, butyl rubbers, Ethylene-Propylene Rubber (EPR), Ethylene Propylene Diene Monomer Rubber (EPDM) rubbers and Sylossanic resins such as Sylgard™ sold by Dow Corning.

The previously mentioned materials may have different MVTRs according to the specific composition, whereby the choice of the polymeric matrix for the manufacturing of the composite absorber must be made on the basis of the correct transmission of $H_2O$, i.e. a value comprised between 0.05 g mm m$^{-2}$ d$^{-1}$ and 5.4 g mm m$^{-2}$ d$^{-1}$ 1. For example an EVA containing a 33% of vinyl-acetate has a MVTR of 5.4 g mm m$^{-2}$ d$^{-1}$ and thus it is suitable for carrying out the invention, whereas an EVA containing a 70% of vinyl-acetate has a transmission of 17.5 g mm m$^{-2}$ d$^{-1}$ and thus it is not suitable.

The transmission data are typically provided by the manufacturer or can be easily found in the literature on texts such as "Permeability and Other Film Properties of Plastic and Elastomer" published by Plastics Design Library, and therefore the choice of a polymer having a given $H_2O$ transmission value can be easily made by those skilled in the art.

The composite absorber object of the present invention contains an amount of material for $H_2O$ removal comprised between 10% and 50% by weight. This percentage is preferably comprised between 30% and 45%. It is important that the weight concentration of the absorber material is not lower than 10% in order to ensure a sufficient capacity.

Another advantage that can be obtained by means of the present invention is that the composite absorber may be easily manufactured with and adapted to different geometries. In particular, according to the present invention it is possible to obtain composite absorbers having a thickness comprised between 0.15 mm and 2 mm, the user being free to define the width and length by means of a simple cutting operation when inserting the absorber inside the medical device.

Typically, this level of adaptability and flexibility of the product in the medical device is obtained at present by using dispensable drying pastes, which have the disadvantage of requiring cautions during their handling and further also need a consolidation phase at temperature higher than ambient temperature inside the product, i.e. the medical device.

In a second aspect thereof, the invention relates to a method for $H_2O$ removal from sealed medical devices by using a composite absorber comprising an active species dispersed in a polymeric matrix, characterized in that the polymeric matrix has an MVTR comprised between 0.05 g mm m$^{-2}$ d$^{-1}$ and 5.4 g mm m$^{-2}$ d$^{-1}$ at 25° C. and 100% RH.

The invention claimed is:

1. A method for $H_2O$ removal from a sealed medical device, comprising:
   introducing in said device a composite absorber comprising one active species in the form of one or more among zeolites, silica gel, alumina, alkali metal oxides, alkaline-earth metal oxides dispersed in a polymeric matrix, wherein said polymeric matrix shows a Moisture Vapour Transmission Rate comprised between 0.05 g mm m$^{-2}$ day$^{-1}$ and 5.4 g mm m$^{-2}$ day$^{-1}$ at 25° C. and 100% relative humidity.

2. The method of claim 1, wherein said alkaline-earth metal oxides compromise calcium oxide, barium oxide or combinations thereof.

3. The method of claim 2, wherein said sealed medical device operates at temperatures of 65°C. or higher and the active species comprises calcium oxide.

4. The method of claim 1, wherein introduction of the composite absorber inside the sealed medical device comprises cutting an absorber sheet with a length and width so that is able to be placed inside said medical device, and a thickness comprised between 0.15 and 2 mm.

5. The method of claim 1, wherein said sealed medical device is selected from pacemakers, neurostimulators, acoustic aids, defibrillators, and electromechanical systems for controlled release of drugs.

* * * * *

UNITED STATES PATENT AND TRADEMARK OFFICE
CERTIFICATE OF CORRECTION

PATENT NO.       : 8,673,060 B2                                           Page 1 of 1
APPLICATION NO. : 13/000971
DATED            : March 18, 2014
INVENTOR(S)      : Bonucci et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 215 days.

Signed and Sealed this

Twenty-ninth Day of September, 2015

Michelle K. Lee
*Director of the United States Patent and Trademark Office*